E. R. WITZEL.
ELECTRIC CURRENT GENERATING PLANT.
APPLICATION FILED JUNE 6, 1914. RENEWED MAR. 14, 1916.

1,202,632.

Patented Oct. 24, 1916.
2 SHEETS—SHEET 2.

Inventor
E. R. Witzel.

Witnesses
W. R. Smith
John J. McCarthy

By Victor J. Evans
Attorney

UNITED STATES PATENT OFFICE.

EARL R. WITZEL, OF DES MOINES, IOWA.

ELECTRIC-CURRENT-GENERATING PLANT.

1,202,632. Specification of Letters Patent. Patented Oct. 24, 1916.

Application filed June 6, 1914, Serial No. 843,486. Renewed March 14, 1916. Serial No. 84,236.

*To all whom it may concern:*

Be it known that I, EARL R. WITZEL, a citizen of the United States, residing at Des Moines, in the county of Polk and State of Iowa, have invented new and useful Improvements in Electric-Current-Generating Plants, of which the following is a specification.

This invention relates to improvements in electric current generating plants and has particular application to an automatically controlled electric current generating plant.

In carrying out the present invention, it is my purpose to provide a plant of the class described which will embody among other features a load circuit connected with a battery and a generator adapted to be driven from a hydro-carbon engine, means being connected in the load circuit and operable when the latter is closed to connect the battery to the generator to operate the latter as a motor whereby the hydrocarbon engine will be placed under initial rotation to pick up its own cycle of operation and drive the generator to supply the load circuit with current.

It is also my purpose to provide an electric generating plant of the type set forth wherein the battery will be automatically cut out of the load circuit and disconnected from the generator as the speed of the latter increases.

A further object of my invention is to provide an electric current generating plant wherein the plant may be put into initial operation by means of a low voltage battery wherein the battery current will be used only to operate the generator as a motor and so crank the hydrocarbon engine when a load is placed across the load circuit and wherein the hydrocarbon engine and generator will be automatically stopped when the load is taken off the load circuit, or the current passing through such circuit reduced to a predetermined value.

A still further object of my invention is the provision of an electric generating plant which will be entirely automatic in operation and which will be brought into service when a load is placed upon the load circuit and cut out of service when the load circuit is broken.

With the above and other objects in view, the invention consists in the construction, combination and arrangement of parts hereinafter set forth in and falling within the scope of the claims.

Figure 1:
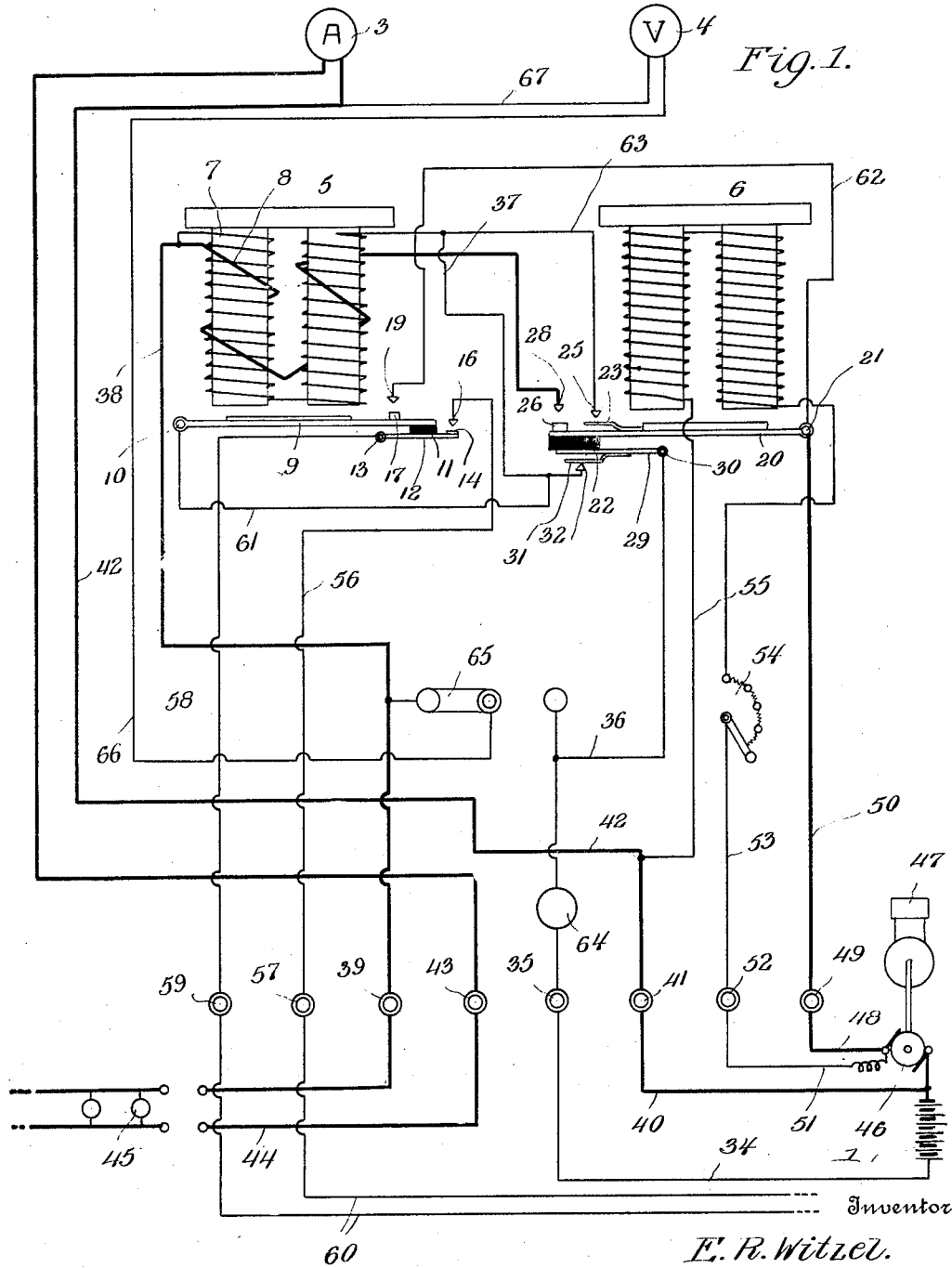
Figure 2:
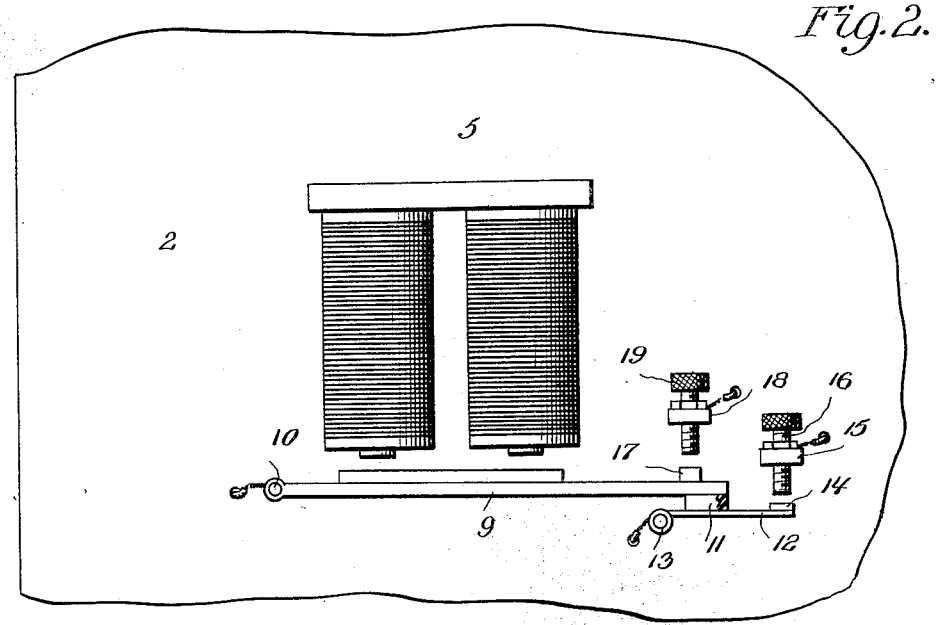
Figure 3:
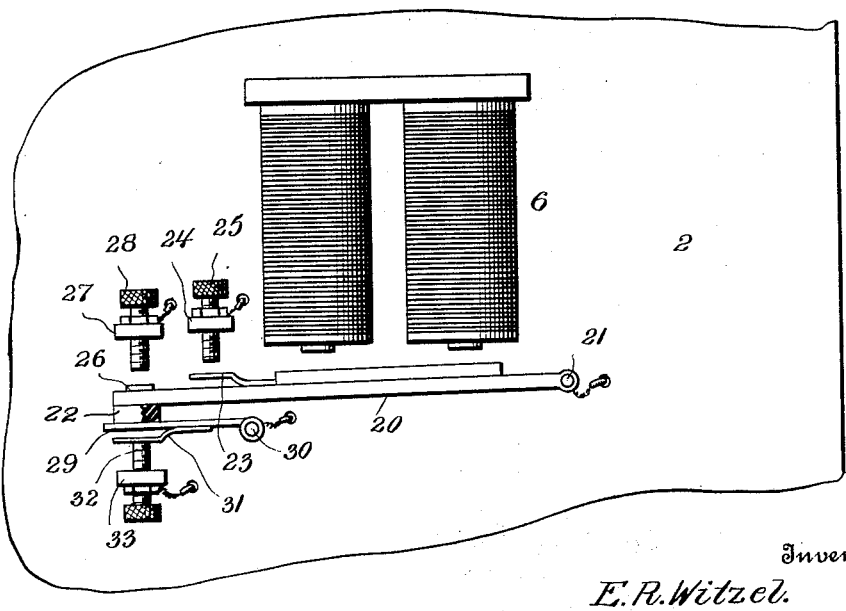

In the accompanying drawings: Figure 1 is a diagrammatic view of an electric current generating plant constructed in accordance with the present invention. Fig. 2 is an enlarged side elevation of one of the controlling relays. Fig. 3 is a similar view of another controlling relay.

Referring now to the drawings in detail, 1 designates a battery which is preferably, although not necessarily, of the storage or accumulator type.

3 and 4 designate an ammeter and voltmeter respectively, while 5 and 6 designate relays respectively.

In the present instance, the relay 5 comprises a vertically disposed electromagnet having a fine wire coil 7 of a large number of turns and a coarse wire coil 8 of a small number of turns, and a horizontal armature 9 disposed below the magnet and under the influence of the pole thereof. One end of the armature 9 is pivoted as at 10, while secured to the under face thereof at the opposite end is a block 11 preferably composed of insulating material. Disposed below the last-mentioned end of the armature 9 is a horizontal spring contact strip 12 having one end secured to the panel board as at 13 and the opposite extremity equipped with an upstanding contact point 14. Mounted above the contact point 14 is a lug 15 formed with a vertical threaded aperture in which is adjustably mounted a contact screw 16 having the lower end thereof disposed immediately adjacent to the contact point 14 and adapted to be engaged thereby. Projecting upwardly from the armature 9 adjacent to the end thereof carrying the block 11 is a contact point 17, while disposed above the contact point 17 is a lug 18 formed with a vertical threaded aperture through which is passed an adjustable contact screw 19 having the lower extremity thereof disposed immediately adjacent to the contact point 17 on the armature. As long as the windings of the magnet of the relay 5 remain deënergized the armature 9 is disengaged from the pole face of the magnet and the insulating block 11 on the outer end of the armature rests upon the spring contact 12 thereby forcing the latter down and holding the contact point 14 out of engagement with the adjacent end of the contact screw 16, while the contact point 17 on the upper surface of the armature is held spaced apart from the adjacent extremity of the contact screw 19. On the other hand, however, when one or both of the windings of the magnet of the relay 5 is energized, the armature 9 swings upwardly about the pivoted end 10 thereof and the contact point 17 thereon engages the adjacent end of the contact screw 19, while the block 11 releases the spring contact 12 thereby permitting the latter to swing the contact point 14 into engagement with the proximate end of the contact screw 16.

In this embodiment of my invention, the relay 6 comprises an electromagnet disposed in a vertical plane and having the coils thereof formed of a single length of wire, and a horizontal armature 20 disposed below the magnet of the relay 6 and in proximity to the pole faces thereof and having one end pivoted as at 21 and the opposite extremity equipped with a depending block 22 of insulating material. Fast to the upper surface of the armature 20 adjacent to the outer end thereof is a contact spring 23, while disposed above the contact spring 23 is a lug 24 formed with a vertical threaded aperture through which is passed a contact screw 25 having the lower extremity thereof disposed in proximity to the contact screw 23 and adapted to be engaged thereby. Extending upwardly from the upper surface of the armature 20 at the outer end thereof is a contact point 26 and mounted above the contact point 26 is a lug 27 formed with a vertical threaded aperture through which is passed a contact screw 28 having the lower extremity thereof disposed in proximity to the contact point 26 and adapted to be engaged thereby and in a plane above the lower extremity of the contact screw 25 so that the contact spring 23 will engage the contact screw 25 previous to the point 26 engaging the adjacent end of the contact screw 28 in the upward movement of the armature 20 under the action of the coils of the relay 6. A horizontal spring strip 29 preferably constructed of brass is disposed below the armature 20 and has one end fastened to the panel board as at 30 and the opposite extremity disposed immediately below the block 22 on the armature 20. Depending from the free extremity of the spring strip 29 is a contact point 31 disposed above a contact screw 32 threaded through a vertical opening in a lug 33. As long as the winding of the relay 6 is deenergized, the armature 20 is spaced apart from the pole faces of the magnet of the relay and the block 22 thereon rests upon the spring strip 29 thereby pressing the latter downwardly and holding the contact point 31 in engagement with the adjacent extremity of the contact point 32. On the other hand, when the magnet of the relay 6 is energized, the armature 20 thereof is drawn upwardly thereby engaging the contact spring 23 with the adjacent extremity of the contact screw 25 and when the coils of the relay are energized to their full capacity the armature 20 is swung upwardly against the tension exerted by the tension of the spring 23 on the contact screw, to engage the contact point 26 with the adjacent extremity of the contact screw 28. In the initial upward movement of the armature 20 to engage the contact spring 23 and contact screw 25, the block 22 releases the spring strip 29 and the latter rebounds or reacts and so disengages the contact point 31 from the contact screw 32.

Leading from one terminal of the battery 1 is a conductor 34 having the free terminal thereof connected with a binding post 35 and extending from the binding post 35 is a conductor 36 tapped onto the spring strip 29. Leading from the lug 33 carrying the contact screw 32 is a conductor 37 connected to one terminal of the winding 7 of the relay 5 and leading from the opposite terminal of such winding is a conductor 38 connected with a binding post 39. From the opposite side of the battery 1 leads a conductor 40 connected with a binding post 41 disposed adjacent to the binding post 35, while extending from the binding post 41 is a conductor 42 extending through the ammeter 3 and tapped onto a binding post 43 in proximity to the binding post 39. Connected to the binding posts 39 and 43 are the terminals of a load circuit or line 44 and connected across the load circuit 44 are lamps 45 and other translating devices.

46 designates a dynamo electric machine, while 47 indicates a hydrocarbon engine which, in the present instance, is direct connected to the dynamo electric machine. In this instance, the dynamo electric machine 46 is of the shunt wound type and one side of the armature winding thereof is connected with the conductor 40 at the point of connection of the latter with the battery 41, while leading from the opposite side of the armature winding is a conductor 48 terminally connected to a binding post 49. Leading from the binding post 49 is a conductor 50 tapped onto the pivoted end 21 of the armature 20 of the relay 6. The shunt field winding of the generator includes a conductor 51 connected with a binding post 52 disposed adjacent to the binding post 49, a conductor 53 extending from the binding post 52 and including the field rheostat 54 and connected with one side of the coil of the relay 6, and a conductor 55 leading from the remaining terminal of the coil of the relay and tapped onto the conductor 42 adjacent to the connection between the last-mentioned conductor and the binding post 41. Leading from the lug 15 carrying the contact screw 16 is a conductor 56 terminally connected with a binding post 57, while extending from the spring contact strip 12 is a conductor 58 terminally connected with a binding post 59 disposed in proximity to the binding post 57 and connected with the binding posts 57 and 59 are the terminals of the primary circuit 60 of the ignition system of the hydrocarbon engine 47. Leading from the lug 33 carrying the contact screw 32 is a conductor 61 terminally connected with the pivoted end 10 of the armature 9, while extending from the lug 18 carrying the contact screw 19 is a conductor 62 having the free terminal thereof tapped onto the conductor 50 at the connection of the latter conductor with the armature 20. Leading from the contact screw 25 is a conductor 63 tapped onto the terminal of the winding 7 of the relay 5 connected with the conductor 37.

In practice, when a lamp switch is closed or other load placed on the load circuit the battery 1 is connected with the line, current flowing from one side of the battery, through the conductor 34, binding post 35, conductor 36, spring strip 29, contact point 31, contact screw 32 in engagement with such contact point, conductor 37, winding thereof, relay 5, conductor 38, binding post 39, through the load line 44, back to the other side of the battery by way of the binding post 43, conductor 42, binding post 41 and conductor 40. This battery current energizes the winding 7 of the relay 5 so that the armature 9 is swung upwardly under the influence of the poles of the magnet of the relay, thereby engaging the contact point 17 with the contact screw 19 and permitting the contact point 14 to engage the contact screw 16. When the contact point 14 engages the contact screw 16, the primary circuit 60 of the ignition system of the hydrocarbon engine 47 is closed. As the contact point 17 engages the contact 19 the battery 1 is connected in circuit with the dynamo electric machine to drive the latter as a motor, current flowing from one side of the battery 1, through the conductor 34, binding post 35, conductor 36, spring strip 29, contact point 31, contact screw 32, conductor 61, armature 9, contact point 17 and screw 19, conductor 62, conductor 50, and back to the other side of the battery 1 through the armature winding of the dynamo electric machine. As this current flows through the armature winding of the motor generator, a portion of such current is shunted through the field and this shunted current passes from one brush of the machine through the shunt field and conductor 51, binding post 52, conductor 53 and rheostat 54 therein, the winding of the relay 6 and then back to the other brush of the machine by way of the conductor 55, the particular portion of the conductor 42, binding post 41 and conductor 40. The machine 46, thus energized, acts as a motor and so places the hydrocarbon engine 47 under initial compression so that the latter may pick up its own cycle of operation. Succeeding the starting of the engine, the speed of the dynamo electric machine increases and such machine acts as a generator and when the voltage delivered by the machine exceeds that of the battery the strength of the field increases thereby increasing the strength of the winding of the relay 6 so that immediately that the current is reversed into the battery the armature 20 is elevated with the effect to relieve the spring strip 29 of the influence of the block 22 whereby the battery circuit is broken at the contact point 31 and contact screw 32 and the generator connected with the load line at the contact spring 23 and contact screw 25, current flowing from one side of the generator, through the conductor 48, binding post 49, conductor 50, armature 20, contact spring 23, contact screw 25, conductor 63, winding 7 of the relay 5, conductor 38, binding post 39, the load line 44 and back to the other side of the generator by way of the binding post 43, conductor 42, binding post 41 and conductor 40. In the movement of the armature 20 under the action of the magnet of the relay 6 to break the connection between the battery and the load line and the battery and the generator and establish a connection between the battery and the load line, the residual magnetism of the magnet of the relay 5 is such as to maintain the armature 9 in elevated position during the swinging of the armature 20 so that the armature 9 will not be released when the circuit of the battery 1 is broken at the contact point 31 and binding screw 32. As the shunt field of the generator builds up, the magnetic action of the relay 6 is increased so that the armature 20 is further elevated to engage the contact point 26 with the contact screw 28 thereby connecting the winding 8 of the relay 5 in parallel with the winding 7 thereof. Thus, as long as the load is on the line 44 the relays 5 and 6 are energized, the generator connected with the load line and the ignition circuit of the hydrocarbon engine closed. When the load is removed from the line the relay 5 is deënergized thereby breaking the primary circuit of the engine ignition system at the contact point 14 and contact screw 16. When the rotation of the generator armature ceases succeeding the deënergization of the ignition system of the hydrocarbon engine, the shunt field current drops to zero, thus deënergizing the relay 6 and permitting the armature 20 to drop to normal position thereby breaking the connection between the generator and the load line and establishing the normal connection between the battery and load line so that when a load is placed across the load circuit or line the plant will again operate as previously described.

In order that the battery will be cut out of service in the event of failure of the hydrocarbon engine to drive the generator or the generator to supply the load line with current, I employ a time circuit breaker 64 connected in the conductor 36 and designed to operate after the battery current flows through the line for a predetermined time 65 designates a single pole double throw switch having one contact stud connected with the conductor 38, the remaining stud connected with the conductor 36 and the pivot post connected by way of a conductor 66 with one binding post of a voltmeter 4, a conductor 67 connecting the remaining terminal of the voltmeter with the conductor 42. By means of this construction it will be seen that the voltmeter may be connected in parallel with the battery when the blade of the switch 65 is thrown into engagement with the contact stud connected with the conductor 36 and with the generator when the blade is engaged with the contact stud connected with the conductor 38 so that the voltage of the battery and generator may be at all times ascertained.

From the foregoing description taken in connection with the accompanying drawings, the construction and mode of operation of my improved electric current generating plant will be readily understood to those skilled in the art to which the invention appertains. It will be seen that I have provided an electric current generating plant wherein a low voltage battery may be employed wherein the battery current is used only to operate the generator as a motor to start the engine, thus permitting the battery to discharge slowly and wherein the battery may be composed of cells of small capacity. Furthermore, it will be seen that the switch controlling a lamp or other translating device connected in the load circuit performs the dual function of a starting switch for the plant and a controlling switch for the lamp.

While I have herein shown and described one preferred form of my invention by way of illustration, I wish it to be understood that I do not limit or confine myself to the precise details of construction herein described and delineated, as modification and variation may be made within the scope of the claims without departing from the spirit of the invention.

I claim:

1. In an electric generating plant, a lamp circuit, a battery connected to said circuit and adapted to feed current therethrough upon the closing of a lamp switch, a shunt wound dynamo-electric machine, a hydrocarbon engine, a connection between said dynamo-electric machine and engine, means connected in said lamp circuit and operable when the latter is closed to connect the battery to the dynamo-electric machine to drive the latter as a motor whereby the engine will be placed under initial compression to pick up its own cycle of operation, and means under the influence of the shunt field of said dynamo-electric machine to break the connection between the battery and lamp circuit, and the battery and dynamo-electric machine, and connect the dynamo-electric machine to the lamp circuit to feed the latter when the dynamo-electric machine delivers a certain voltage.

2. In an electric generating plant, a lamp circuit, a battery connected to said circuit and adapted to feed current therethrough upon the closing of a lamp switch, a shunt wound dynamo-electric machine, a hydrocarbon engine, a connection between said dynamo-electric machine and engine, means connected in said lamp circuit and operable when the latter is closed to connect the battery to the generator to drive the latter as a motor whereby the engine will be placed under initial compression to pick up its own cycle of operation, means under the control of said last means to close the ignition circuit of said engine simultaneously with the operation of the dynamo-electric machine from the battery, and means under the influence of the shunt field of said dynamo-electric machine to break the connection between the battery and lamp circuit and the battery and dynamo-electric machine and connect the dynamo-electric machine to the lamp circuit to feed the latter.

3. In an electric generating plant, a lamp circuit, a battery connected to said circuit and adapted to feed current therethrough upon the closing of a lamp switch, a shunt wound dynamo-electric machine, a hydrocarbon engine, a connection between said dynamo-electric machine and engine, a relay connected in said lamp circuit and operable when the latter is closed to connect the battery to the dynamo-electric machine to drive the latter as a motor whereby the engine will be placed under initial compression to pick up its own cycle of operation, and a second relay under the influence of the shunt field of said dynamo-electric machine to break the connection between the battery and lamp circuit and the battery and dynamo-electric machine, and connect the dynamo-electric machine to the lamp circuit to feed the latter.

4. In an electric generating plant, a lamp circuit, a battery connected to said circuit and adapted to feed current therethrough upon the closing of a lamp switch, a shunt wound dynamo-electric machine, a hydrocarbon engine, a connection between said dynamo-electric machine and engine, a relay connected in said lamp circuit and operable when the latter is closed to connect the battery to the dynamo-electric machine to drive the latter as a motor whereby the engine will be placed under initial compression to pick up its own cycle of operation, a second relay under the influence of the shunt field of said dynamo-electric machine to break the connection between the battery and lamp circuit and the battery and dynamo-electric machine, and connect the dynamo-electric machine to the lamp circuit to feed the latter, and means under the control of said first relay to close the primary circuit of the ignition system of said hydrocarbon engine simultaneously with the connecting of the battery to the dynamo-electric machine.

5. In an electric current generating plant, a load circuit, a battery connected to said circuit, a hydrocarbon engine, a dynamo-electric machine, a connection between said dynamo-electric machine and engine, means connected in said load circuit and operable when the latter is closed to connect the battery to the dynamo-electric machine to drive the latter as a motor whereby the engine will be placed under initial compression to pick up its own cycle of operation, and means operable from said dynamo-electric machine as the speed of the latter increases to break the connection between the battery and dynamo-electric machine and the battery and the load line and connect the dynamo-electric machine to the load line.

6. In an electric current generating plant, a load circuit or line, a battery connected to said circuit, a hydrocarbon engine, a dynamo-electric machine, a connection between said dynamo-electric machine and engine, means connected in said load circuit and operable when the latter is closed to connect the battery to the dynamo-electric machine to drive the latter as a motor whereby the engine will be placed under initial compression to pick up its own cycle of operation, and means operable from the dynamo-electric machine to break the connection between the battery and the dynamo-electric machine and the battery and load line and connect the dynamo-electric machine to the load line when the dynamo-electric machine delivers a certain voltage.

7. In an electric current generating plant, a load circuit or line, a battery connected to said circuit, a hydrocarbon engine, a dynamo-electric machine, a connection between said dynamo-electric machine and engine, means connected in said load circuit and operable when the latter is closed to connect the battery to the dynamo-electric machine to drive the latter as a motor whereby the engine will be placed under initial compression to pick up its own cycle of operation, means operable from the dynamo-electric machine to break the connection between the battery and the dynamo-electric machine and the battery and load line and connect the dynamo-electric machine to the load line when the dynamo-electric-machine delivers a certain voltage, and means for breaking the connection between the battery and load line in the event of failure of the engine to drive the dynamo-electric machine or the dynamo-electric machine to deliver current.

8. In an electric current generating plant, a load circuit, a battery connected to said circuit, a hydrocarbon engine, a shunt wound dynamo-electric machine, a connection between said dynamo-electric machine and engine, means connected in said load circuit, and operable when the latter is closed to connect the battery to the dynamo-electric machine to drive the latter as a motor, whereby the engine will be placed under initial compression to pick up its own cycle of operation, and means under the influence of the shunt field of said dynamo-electric machine to break the connection between the battery and load circuit and the battery and dynamo-electric machine and connect the dynamo-electric machine to the load circuit to feed the latter when the dynamo-electric machine delivers a certain voltage.

In testimony whereof I affix my signature in presence of two witnesses.

EARL R. WITZEL.

Witnesses:
   GEO. D. NEWCOM,
   J. M. WITZEL.